March 20, 1951 J. R. BRINKLEY 2,545,511

RADIO COMMUNICATION SYSTEM

Filed July 29, 1947 2 Sheets-Sheet 1

INVENTOR
John Raymond Brinkley
BY
Arthur A. Johnson
ATTORNEY

INVENTOR
John Raymond Brinkley
BY
Arthur A. Johnson
ATTORNEY

Patented Mar. 20, 1951 2,545,511

UNITED STATES PATENT OFFICE 2,545,511

RADIO COMMUNICATION SYSTEM

John Raymond Brinkley, London, England

Application July 29, 1947, Serial No. 764,391
In Great Britain May 2, 1945

Section 1, Public Law 690, August 8, 1946
Patent expires May 2, 1965

5 Claims. (Cl. 250—6)

This invention relates to radio communication systems and more particularly to systems for communicating with receiving stations by means of amplitude-modulated carrier-waves of such high frequency that direct reception is practically limited to an area bounded approximately by the horizon of the transmitter.

The object of the invention is to extend the area which can be covered by such systems and/or to provide more even distribution of field strength than is possible with present systems using very high frequencies, i. e. frequencies greater than about 30 megacycles per second.

According to the invention, two or more transmitters having their antennae separated in space and adapted to operate with different carrier frequencies are arranged to be amplitude modulated synchronously so that the same signal is transmitted simultaneously on all carrier-frequencies, the said carrier frequencies being so chosen that they all lie within the radio-frequency band-width of the receivers for which the signals are intended and are spaced in frequency in such manner that inter-modulation products occurring in sufficient strength to interfere seriously with reception fall outside the audio band-width of the receiver.

The effect of this arrangement is that the signals operate additively in the receiver so that a mobile receiving station may move into regions in which the field strength is due substantially entirely to any one of the transmitters or into regions in which signals in equal or comparable strength are received from two or more of the transmitters, and will continue to receive satisfactorily without any need for retuning or other adjustment when passing from one region to another.

The transmitters may be located at separate sites sufficiently remote from one another to increase greatly the area within which the signals can be received or they may be located at the same site with their antennae separated by a distance of only a few feet. In the latter case, the outer boundaries of the signal fields of the individual transmitters may be regarded as coincident for all practical purposes, but it is found that local variations of field strength, such as are caused by reflections from buildings, are smoothed out by reason of the relative geometrical displacement of the transmitters, so that reception is much more even than would be the case if all the signal energy were radiated from a single point.

Figure 1:
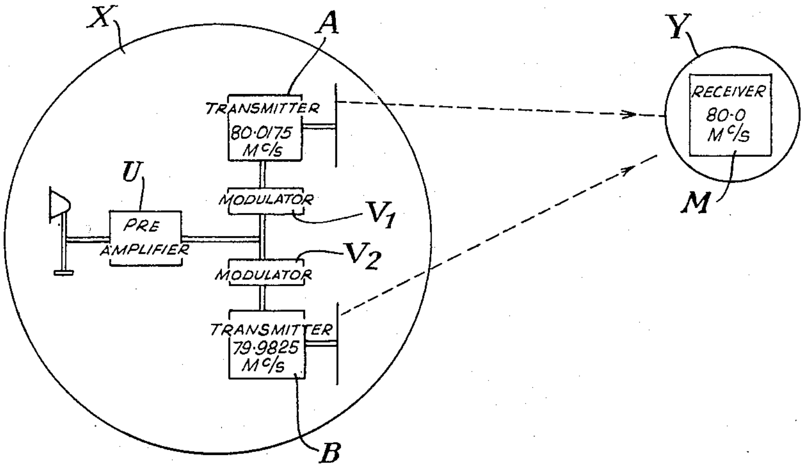
Figure 2:
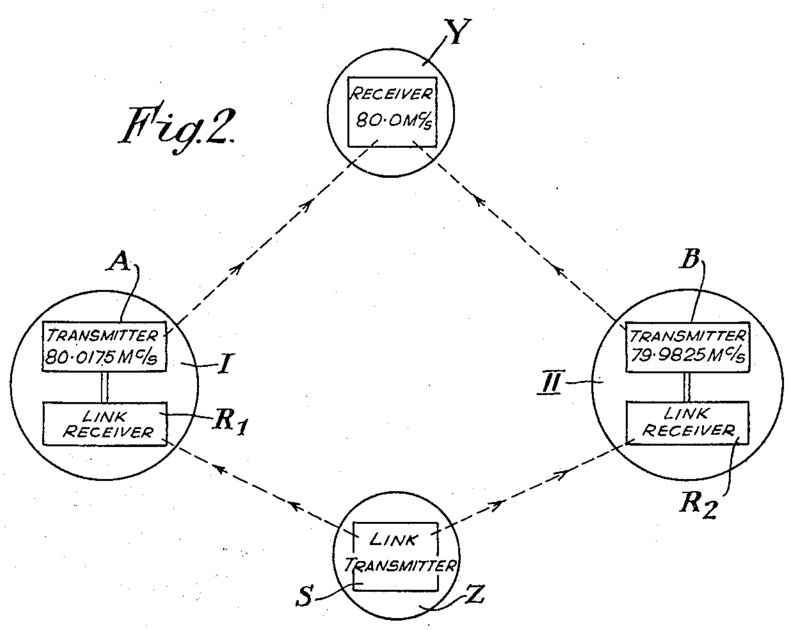
Figures 3, 4:
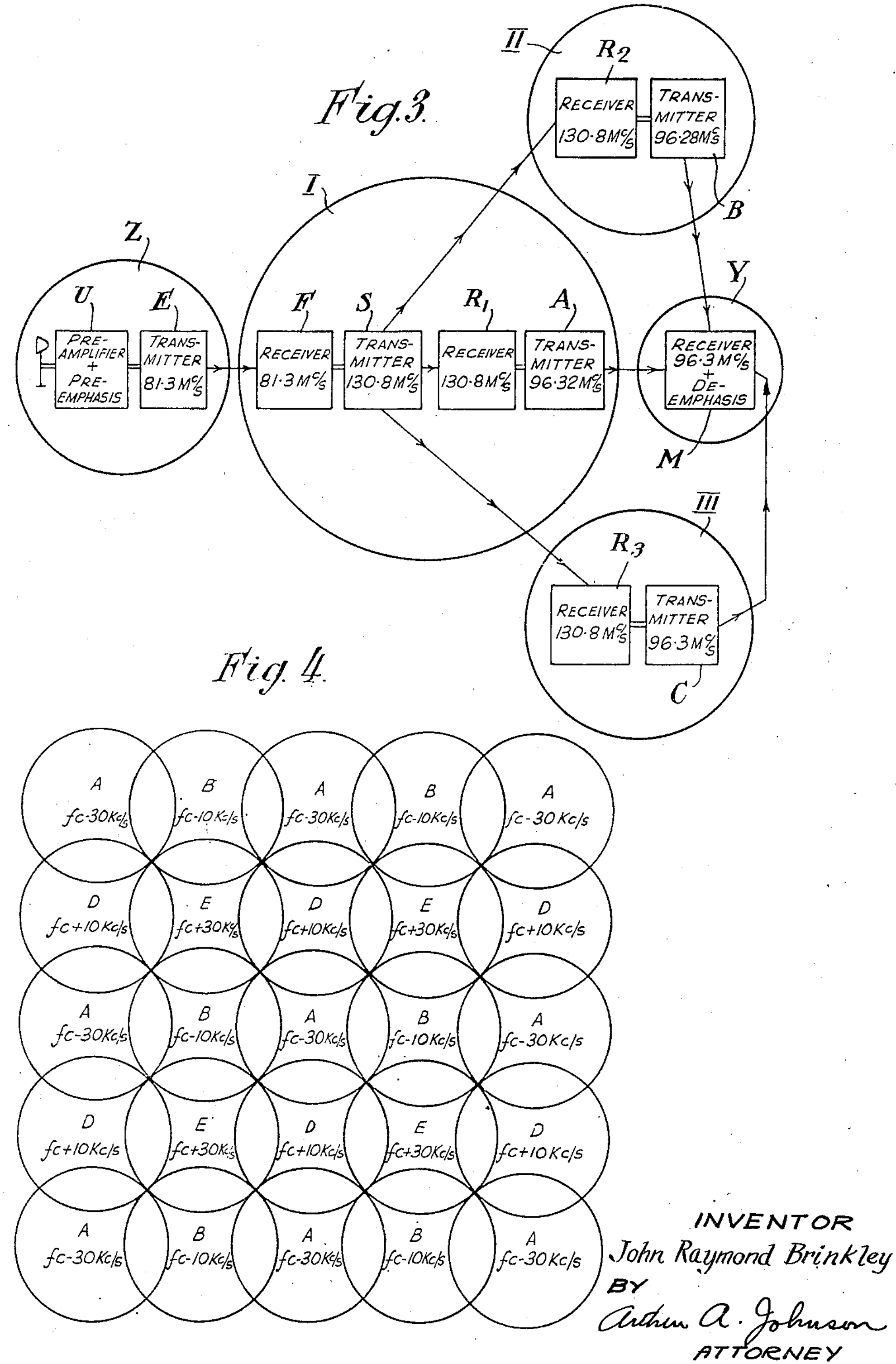

In order that the invention may be well understood, several examples of systems embodying the invention will now be described with reference to the accompanying drawings in which:

Figure 1 is a diagram illustrating a system employing two transmitters located at the same site, Figure 2 is a diagram illustrating an arrangement employing two transmitters located at separate sites, Figure 3 is a diagram illustrating an arrangement employing three transmitters located at separate sites, and Figure 4 is a diagram showing how a large number of transmitters can be arranged in groups of four so as to cover any required area without using more than four different carrier frequencies.

In the arrangement shown in Figure 1, two very high frequency transmitters A and B, arranged to operate with different carrier frequencies and having their antennae spaced apart, are located at a single station X. The two transmitters are modulated synchronously by means of modulators V1 and V2 under the control of a pre-amplifier U which receives speech or other audio-frequency signals. Suitable precautions are taken to ensure that the modulations of the two transmitters are substantially identical in amplitude and phase. The same signals are thus transmitted simultaneously by the two transmitters.

The carrier frequencies of transmitters A and B are chosen so that they both lie within the normal band-width of a single very high frequency channel but are separated sufficiently to ensure that inter-modulation products occurring in sufficient strength to interfere seriously with reception do not fall within the audio-frequency band-width required for the effective transmission of the speech or other signals. In the example shown, the transmitter A operates at a frequency of 80 megacycles +17.5 kilocycles per second and the transmitter B operates at the frequency of 80 megacycles —17.5 kilocycles per second. The antennae of the transmitters A and B are separated by a distance of, for example, 100 feet.

The signals sent out by the transmitters A and B are received by mobile receiving stations (one of which is represented at Y in Figure 1) equipped with receivers whose band-width is sufficient to enable them to receive signals from either of the antennae A and B or from both of them simultaneously. In the example illustrated, the receiver M, which is of normal construction, is tuned to the channel frequency of 80 megacycles per second and has a radio-frequency band-width of at least 50 kilocycles per second. The transmissions from the antennae A and B lie comfortably within the radio-frequency band-width of such a receiver and the signals from the antennae A and B thus operate additively in the receiver with the result that local variations of field strength such as are caused by reflections from buildings are smoothed out by reason of the relative geometrical displacement of the antennae of the transmitters A and B. The reception is thus more even than would be the case if all the signal energy were radiated from a single point.

In the arrangement shown in Figure 2 of the drawings, two very high frequency transmitters A and B operating with different carrier frequencies are located at separate stations I and II on sites which are remote from one another and which are so chosen as to serve an extended area within every part of which it is possible to receive signals from one or other of the transmitters or from both of them.

The two transmitters are modulated synchronously with speech or other audio-frequency signals under the control of a common control station Z in which there is a link transmitter S from which signals are transmitted to receivers R1 and R2 at the stations I and II, suitable precautions being taken to ensure that the modulations applied to the transmitters A and B are substantially identical in amplitude and phase.

As in the arrangement previously described, the frequencies of the transmitters A and B are so chosen that they both lie within the normal band-width of a single very high frequency channel but are separated sufficiently to ensure that intermodulation products occurring in sufficient strength to interfere seriously with reception do not fall within the audio-frequency band-width required for the effective transmission of the speech or other signals sent out from the control station Z. In the example illustrated in Figure 2, the frequency of the transmitter A is 80 megacycles+17.5 kilocycles and the frequency of the transmitter B is 80 megacycles−17.5 kilocycles.

The signals sent out from the stations I and II are received by mobile receiving stations (one of which is represented at Y in the drawings) each of which is equipped with a receiver M having a radio-frequency band-width sufficient for receiving comfortably the transmission from the transmitters A and B. In the example illustrated, the receiver M is an 80 megacycle receiver of ordinary construction having a band-width of at least 50 kilocycles per second. The transmissions from the transmitters A and B lie comfortably within the radio-frequency band-width of such a receiver so that the signals from the two stations operate additively in the receiver. The mobile receiving station may therefore move into regions in which the field strength is due substantially entirely to one of the transmitters A or B or into regions in which signals in equal or comparable strength are received from both transmitters and will continue to receive satisfactorily without any need for re-tuning or other adjustment when passing from one region to the other.

Figure 3 of the drawings shows a system in which three very high frequency transmitters A, B and C, operating with different carrier frequencies, are located at three separate stations I, II and III which are remotely situated from one another on sites so chosen as to serve an extended area within every part of which it is possible to receive signals from one or other of the transmitters or from more than one of them simultaneously. The transmitters A, B and C are modulated synchronously with speech or other audio-frequency signals under the control of a common control station Z. The control station Z could be arranged to transmit control signals directly to each of the stations I, II and III but, in the arrangement illustrated in Figure 3, the control station Z is equipped with a link transmitter E which receives speech or other audio-frequency signals from a pre-amplifier U and which transmits these signals to a link receiver located in the station I and having its output coupled to the input of a link transmitter S from which signals are sent out to each of three link receivers R1, R2 and R3 located in the stations I, II and III respectively.

This system of link transmitters and receivers is designed to modulate the transmitters A, B and C synchronously under the control of the control station Z and is arranged so that the modulations of the stations A, B and C are all substantially identical in amplitude and phase. Since the receiver R1 is located at the same station as the transmitter A, it may be connected to the latter by means of a conductive line, suitable delay net-works being associated with the receiver R1 and also with one of the receivers R2 and R3 if necessary to equalise the modulation phase of the signals received by the receivers R1, R2 and R3. Alternatively, the receiver R1 may be omitted and the transmitter A may receive its modulation input direct from the audio-frequency output of the receiver F, suitable phasing and delay net-works being arranged where necessary to equalise the modulation phases of the signals sent out by the transmitters A, B and C.

The frequencies of the transmitters A, B and C are chosen so that they all lie within the normal radio-frequency band-width of a single radio channel but are separated sufficiently to ensure that inter-modulation products occuring in sufficient strength to interfere seriously with reception do not fall within the audio-frequency band-width required for the effective transmission of the speech or other signals sent out from the control station Z. In the example illustrated in Figure 3, the transmitter A has a frequency of 96.3 megacycles+20 kilo-cycles whilst the transmitter B operates at 96.3 megacycles−20 kilocycles per second and the transmitter C operates at 96.3 megacycles per second.

The signal sent out from the stations I, II and III are received by mobile receiving stations, one of which is represented at Y in Figure 3. Each receiving station is equipped with a receiver M having a radio frequency band-width of 50 kilocycles per second capable of receiving the transmission from any of the transmitters A, B and C or from all of them simultaneously. In the arrangement illustrated, the receiver M, which is of ordinary construction, is tuned to the channel frequency of 96.3 megacycles per second so that the transmission from all the transmitters A, B and C lie comfortably within the band-width of the receiver. The transmissions from the stations I, II and III thus operate additively in the receiver M so that the mobile receiving station may move into regions in which the field strength is due substantially entirely to one of the transmitters A, B and C or into regions in which signals in equal or comparable strength are received from two or more of these transmitters and will continue to receive satisfactorily without any need for re-tuning or adjustment when passing from one region to another.

It will be evident that the number of transmitters can be increased still further if required by increasing the number of different carrier-frequencies employed within the normal band-width of a single communication channel. For example, four transmitters could be used having carrier frequencies of 100 megacycles+10 kilocycles per second, 100 megacycles−10 kilocycles per second, 100 megacycles+30 kilocycles per second and 100 megacycles−30 kilocycles per second respectively. In this example, and also in the example illustrated in Figure 3 of the drawings, unwanted products due to fourth-order beats between the carriers may be faintly audible in certain circumstances unless the relative frequency stability is maintained to ensure that the difference between the frequencies of any two transmitters adjacent in frequency does not differ from the difference between any other two adjacent transmitters by more than about 200 cycles per second. If this condition is met and the receivers are given a cut-off below about 200 cycles per second then the fourth-order beat will be inaudible. Alternatively, the fourth-order beats may be rendered inaudible by spacing the carrier frequencies unequally. For example, the transmitter A may have a frequency of 96.3 megacycles+20 kilocycles per second whilst the transmitter B has a frequency of 96.3 megacycles−10 kilocycles per second and the transmitter C has a frequency of 96.3 megacycles per second.

In all the arrangements according to the invention so far described, there is only one transmitter operating at each of the different carrier frequencies employed. It is possible, however, to employ more than one transmitter operating at the same carrier frequency provided that all the transmitters which operate at the same carrier frequency are situated so remote from one another that it is impossible to receive signals from any two of them simultaneously.

Where four transmitters operating at four different carrier frequencies are employed, it is possible, without increasing the number of carrier frequencies required, to increase the area served indefinitely by adding further transmitters operating at frequencies so chosen that no two transmitters operating at the same frequency are near enough together to be received simultaneously. This is illustrated diagrammatically in Figure 4 of the drawings in which the overlapping circles represent the transmission fields of a number of transmitters distributed over the whole area to be served. The transmitters represented by these circles are divided into groups each of which comprises four transmitters marked A, B, D and E and operating at different carrier frequencies. For example, the transmitters A may operate at frequency $fc-30$ kilocycles, whilst the transmitters B operate at $fc-10$ kilocycles, the transmitters D operate at $fc+10$ kilocycles and the transmitters E operate at $fc+30$ kilocycles. Each group of four adjacent transmitters A, B, D and E is arranged relatively to its neighbours in such a way that every two transmitters operating at the same carrier frequency lie on opposite sides of a transmitter operating at a different carrier frequency. Transmitters operating at the same frequency are thus so far separated in space that they have no common reception area but the transmission field of every transmitter overlaps with that of at least one adjacent transmitter so that the whole system covers a continuous area in every part of which signals can be received from at least one transmitter. All the transmitters of the system illustrated in Figure 1 are modulated simultaneously under the control of a common control station so that they all transmit the same signal and so that the modulation applied to all of them is as nearly as possible identical in phase and amplitude. A mobile receiver tuned to the frequency $fc$ can thus move freely over the whole area covered by the transmitters and will continue to receive satisfactorily without any need for re-tuning or adjustment when passing from one part of the system to another.

In the diagram in Figure 4, the transmitters have been shown equi-distant from one another for the sake of clearness but it is of course not essential to adhere to this regular pattern. In practice the sites for the individual transmitters will be chosen to suit local conditions and the arrangement of the stations will thus usually depart from the strict geometrical pattern indicated. The only essential requirement is that stations operating at the same carrier frequency must be so far separated that no two of them can be received simultaneously.

In any of the systems herein described, provision may be made for two-way communication by providing suitable transmitters on the mobile stations and arranging suitable receivers for picking up the signals sent out by the mobile stations and for transmitting them to the control station.

In the examples illustrated herein the frequencies of the transmitters which send out the signals to be received by the mobile receiving stations are so chosen that the beat frequencies which occur have frequencies of 20 kilocycles or more. It is obviously unnecessary to make any special provision in the mobile receivers to exclude these frequencies from the audio-frequency circuits of the receivers. The mobile receivers may therefore be of ordinary construction. It is not essential, however, to space the carrier frequencies of the transmitters so far apart as to bring inter-modulation products outside the audible range. The invention extends to systems in which the beats produced have audible frequencies falling outside the frequency range of the speech or other signal sent out from the central station and in which the mobile receivers are equipped with special means for limiting their audio-frequency reception to frequencies below the lowest beat frequency produced by the transmitters.

Although the invention is primarily intended for communicating with mobile receiving stations it is also possible to work with fixed receiving stations and the invention will enable fixed receiving stations to operate satisfactorily anywhere within a region in which signals can be received from one or more of the transmitters.

I claim:

1. A very high frequency radio communication system comprising a receiver having solely a single tuned radio-frequency circuit and a circuit responsive to the modulating audio-frequency signals for receiving amplitude-modulated waves, the effective band width of said radio-frequency tuned circuit being greater than the maximum effective transmission frequency of said circuit responsive to the modulating audio-frequency signals; a plurality of transmitters having separate antennae each transmitting energy to said receiver, said transmitters having different tuned carrier frequencies within the effective band width of the single tuned radio-frequency circuit of said receiver and each said tuned frequencies of said transmitters being separated from every other of said transmitted frequencies by a frequency difference greater than the maximum effective transmission frequency of the circuit of said receiver which is responsive to the modulating audio-frequency signals; and means for applying a predetermined signal modulation simultaneously to all of said transmitters.

2. A very high frequency radio communication system according to claim 1, wherein said transmitters are located remote from one another for radiating over different overlapping portions of an extended area.

3. A very high frequency radio communication system according to claim 1, wherein said antennae are spaced apart for radiating energy by different paths to any point within the range of said transmitters.

4. A radio communication system according to claim 1 wherein the carrier-frequencies have values to cause the inter-modulation frequencies produced thereby to fall outside the absolute audible range.

5. A radio communication system according to claim 1 wherein the carrier-frequencies have values to cause the inter-modulation frequencies produced thereby to fall inside the absolute audible range but outside the range of frequencies of said predetermined signal modulation, and wherein the receiver has means for limiting, to frequencies below the lowest beat frequency produced by the transmitters, the output of the said circuit responsive to the modulating audio-frequency signals.

JOHN RAYMOND BRINKLEY.

REFERENCES CITED

The following references are of record in the file of this patent:

UNITED STATES PATENTS

| Number | Name | Date |
|---|---|---|
| 1,506,358 | Bronk | Aug. 26, 1924 |
| 1,751,516 | Green | Mar. 25, 1930 |
| 1,754,881 | Clement | Apr. 15, 1930 |
| 1,758,940 | Gage | May 30, 1930 |
| 1,824,827 | Martin | Sept. 29, 1931 |
| 1,836,594 | Heising | Dec. 15, 1931 |
| 1,877,858 | Hahnemann | Sept. 20, 1932 |
| 1,881,483 | Gillett | Oct. 11, 1932 |
| 2,033,271 | Aiken | Mar. 10, 1936 |
| 2,106,806 | Latimer et al. | Feb. 1, 1938 |
| 2,127,015 | Tillyer | Aug. 16, 1938 |
| 2,140,730 | Batchelor | Dec. 20, 1938 |
| 2,154,923 | Walter | Apr. 18, 1939 |
| 2,409,208 | Holst | Oct. 15, 1946 |
| 2,429,504 | Ziegler | Oct. 21, 1947 |
| 2,458,124 | Wilmotte | Jan. 4, 1949 |

FOREIGN PATENTS

| Number | Country | Date |
|---|---|---|
| 258,438 | Italy | Apr. 25, 1928 |